(12) United States Patent
Ohno et al.

(10) Patent No.: US 7,556,297 B2
(45) Date of Patent: Jul. 7, 2009

(54) ATTACHMENT STRUCTURE OF ENERGY ABSORBING STRUCTURE

(75) Inventors: Yoshikazu Ohno, Okazaki (JP);
Haruhiko Yamamoto, Nishikamo-gun (JP); Takao Ito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 80 days.

(21) Appl. No.: 11/878,081

(22) Filed: Jul. 20, 2007

(65) Prior Publication Data
US 2008/0023972 A1    Jan. 31, 2008

(30) Foreign Application Priority Data
Jul. 28, 2006    (JP) .............................. 2006-206697

(51) Int. Cl.
*B60R 19/18* (2006.01)
(52) U.S. Cl. ..................................................... 293/120
(58) Field of Classification Search ................ 293/110, 293/120–122, 142–144
See application file for complete search history.

(56) References Cited

U.S. PATENT DOCUMENTS

| | | | |
|---|---|---|---|
| 3,841,044 A * | 10/1974 | Brown et al. ............. | 52/717.05 |
| 4,917,426 A * | 4/1990 | Copp ........................ | 293/142 |
| 6,962,379 B2 * | 11/2005 | Minami et al. ............. | 293/120 |
| 7,201,412 B2 | 4/2007 | Kashiwagi et al. | |
| 2006/0028037 A1 | 2/2006 | Kashiwagi et al. | |

FOREIGN PATENT DOCUMENTS

| | | | |
|---|---|---|---|
| DE | 30 20 997 | | 2/1982 |
| DE | 10 2005 035 756 | | 2/2006 |
| EP | 1 564 079 A1 | | 8/2005 |
| JP | U-58-82968 | | 6/1983 |
| JP | A-58-211942 | | 12/1983 |
| JP | A-60-229843 | | 11/1985 |
| JP | WO2004028863 | * | 4/2004 |
| JP | A 2004-210040 | | 7/2004 |
| JP | A 2005-343255 | | 12/2005 |

* cited by examiner

*Primary Examiner*—Dennis H Pedder
*Assistant Examiner*—Pinel E Romain
(74) *Attorney, Agent, or Firm*—Oliff & Berridge PLC (57) ABSTRACT

An attachment structure of an energy absorbing structure includes: a bumper reinforcement that includes an attachment surface, with insertion holes being formed in the attachment surface; an energy absorbing structure disposed in contact with the attachment surface; locking claws that are disposed on the energy absorbing structure and engage with the bumper reinforcement to lock the energy absorbing structure to the bumper reinforcement; and load receiving projections that are disposed on the energy absorbing structure and are inserted into the insertion holes, so that when a load in a direction along the attachment surface acts on the energy absorbing structure, the load receiving projections interfere with inner peripheral portions of the insertion holes and receive the load.

4 Claims, 6 Drawing Sheets

ATTACHMENT STRUCTURE OF ENERGY ABSORBING STRUCTURE

CROSS-REFERENCE TO RELATED APPLICATION

This application claims priority under 35 USC 119 from Japanese Patent Application No. 2006-206697, the disclosure of which is incorporated by reference herein.

BACKGROUND OF THE INVENTION

1. Field of the Invention

The present invention relates to an attachment structure for attaching an energy absorbing structure formed from a resin or the like to a bumper reinforcement of a vehicle.

2. Description of the Related Art

Conventionally, as an attachment structure for attaching an energy absorbing structure (shock absorbing member) to a vehicle body outer side end surface (attachment surface) of a bumper reinforcement, an attachment structure is known where, as described in JP-A No. 2004-210040, for example, flange-like projecting portions are disposed on both upper and lower end portions of a bumper reinforcement and where the energy absorbing structure is disposed with plural attachment portions—that is, locking claws—that lock with the projecting portions. In this attachment structure, when a load along the vertical or lateral direction with regard to the vehicle—that is, a load in a direction along the attachment surface of the bumper reinforcement—is inputted to the energy absorbing structure, there is a possibility that the locking claws would break.

SUMMARY OF THE INVENTION

It is an object of the present invention to provide an attachment structure of an energy absorbing structure that can control a breakage of the locking claws disposed on the energy absorbing structure when a load in a direction along the attachment surface of the bumper reinforcement is applied to the energy absorbing structure.

A first aspect of the invention relates to an attachment structure of an energy absorbing structure comprising: a bumper reinforcement that includes an attachment surface, insertion holes being formed in the attachment surface; an energy absorbing structure disposed in contact with the attachment surface; locking claws that are disposed on the energy absorbing structure and engage with the bumper reinforcement to fix the energy absorbing structure to the bumper reinforcement; and load receiving projections that are disposed on the energy absorbing structure and are inserted into the insertion holes, so that when a load in a direction along the attachment surface is applied to the energy absorbing structure, the load receiving projections interfere with inner peripheral portions of the insertion holes and receive the load.

In the attachment structure of an energy absorbing structure pertaining to the first aspect, when a load in a direction along the attachment surface of the bumper reinforcement is applied to the energy absorbing structure, the load receiving projections inserted into the insertion holes in the bumper reinforcement interfere with the inner peripheral portions of the insertion holes and receive the load. Consequently, transmission of the load to the locking claws can be prevented, and thus, breakage of the locking claws break can be controlled.

A second aspect of the invention relates to the attachment structure of an energy absorbing structure pertaining to the first aspect, wherein the energy absorbing structure includes a body portion and ribs formed integrally on the body portion, with the load receiving projections being formed integrally with the ribs.

In the attachment structure of an energy absorbing structure pertaining to the second aspect, the load receiving projections are formed integrally with the ribs of the energy absorbing structure body portion. Consequently, when a load is applied on the load receiving projections, the load receiving projections are strongly supported by the ribs.

A third aspect of the invention relates to the attachment structure of an energy absorbing structure of the first or second aspect, wherein each of the load receiving projections includes a hollow portion and a solid portion, with the solid portions being disposed in positions along the attachment surface.

In the attachment structure of an energy absorbing structure pertaining to the third aspect, when a shearing load along the attachment surface of the bumper reinforcement is applied to the load receiving projections, the shearing force is transmitted to the strong solid portions because of interference between the load receiving projections and the insertion holes. Consequently, breakage of the load receiving projections can be controlled. Moreover, because the load receiving projections include the hollow portions, molding of the load receiving projections can be made easy when, for example, the energy absorbing structure is molded by injection molding.

A fourth aspect of the invention relates to the attachment structure of an energy absorbing structure of any of the first to third aspects, wherein the locking claws are disposed on an outer peripheral portion of the energy absorbing structure and engage with an outer peripheral portion of the bumper reinforcement.

In the attachment structure of an energy absorbing structure pertaining to the fourth aspect, the locking claws disposed on the outer peripheral portion of the energy absorbing structure engage with the outer peripheral portion of the bumper reinforcement, whereby the energy absorbing structure is locked to the bumper reinforcement. In this manner, because the locking claws are disposed on the outer peripheral portion of the energy absorbing structure where it is not prone to influence of the load applied to the energy absorbing structure, breakage of the locking claws can be controlled even more effectively.

A fifth aspect of the invention relates to the attachment structure of an energy absorbing structure of any of the first to fourth aspects, wherein convex portions that are to be positioned inside of the insertion holes are disposed on the load receiving projections.

In the attachment structure of an energy absorbing structure pertaining to the fifth aspect, the load receiving projections include convex portions disposed on the inner sides of the insertion holes, so that even when there is a clearance between the load receiving projections and the inner peripheral portions of the insertion holes, the convex portions interfere with the inner peripheral portions of the insertion holes, whereby rattling of the load receiving projections with respect to the insertion holes can be controlled.

DESCRIPTION OF THE PREFERRED EMBODIMENT

Figure 1:
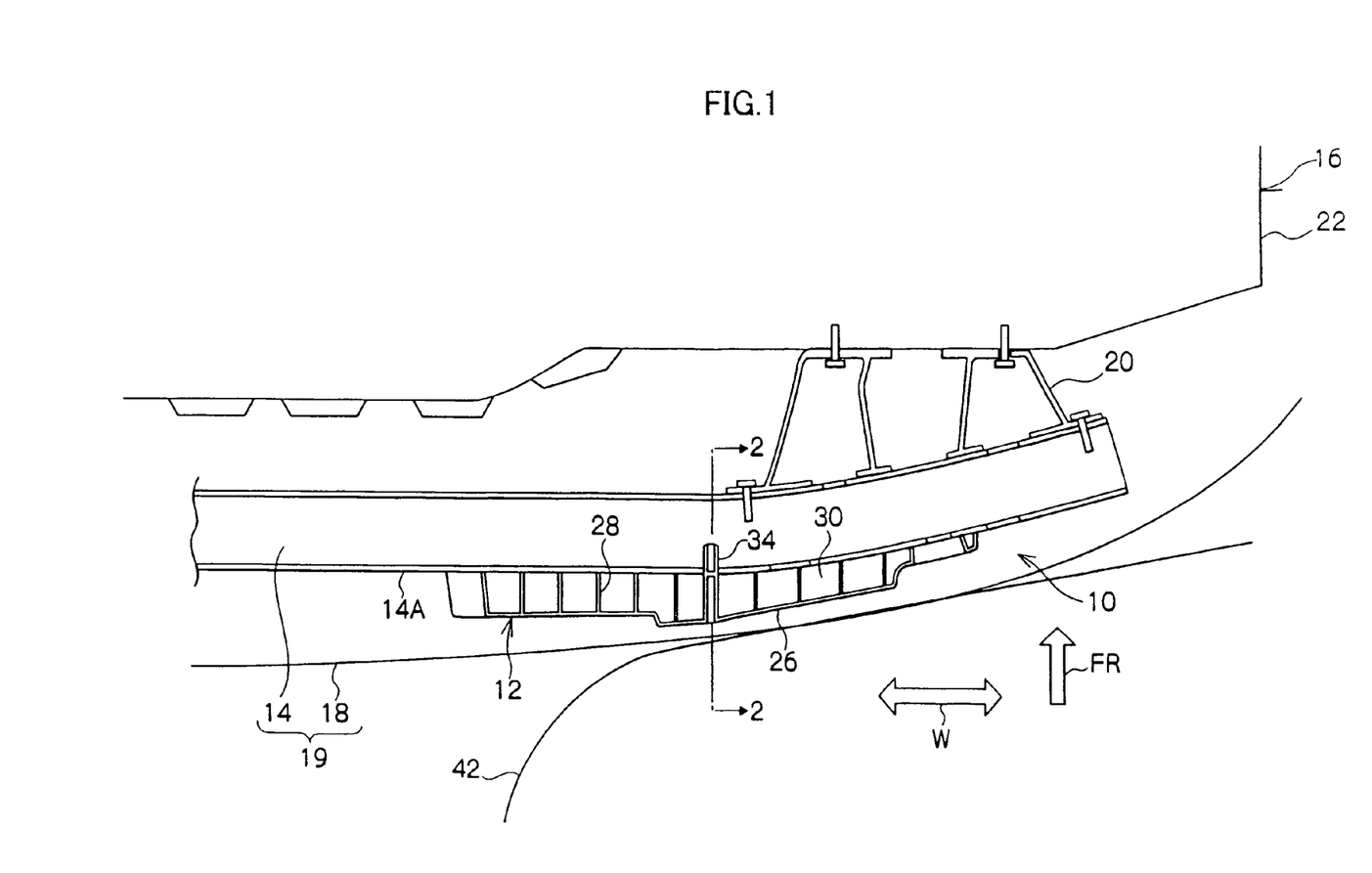
FIG. 1 is a cross-sectional view showing the partial configuration of a vehicle to which an attachment structure pertaining to an exemplary embodiment of the invention is applied.

As shown in FIG. 1, an attachment structure 10 pertaining to an exemplary embodiment of the present invention is configured by a rear bumper reinforcement 14 of a vehicle 16 and by an energy absorbing structure 12 that is attached to the rear bumper reinforcement 14. It will be noted that hatching has been omitted in FIG. 1 for the convenience of description. Further, in the drawings, arrow UP, arrow FR, and arrow W represent an upward direction, a forward direction, and a width direction with regard to the vehicle 16, respectively.

Figure 2:
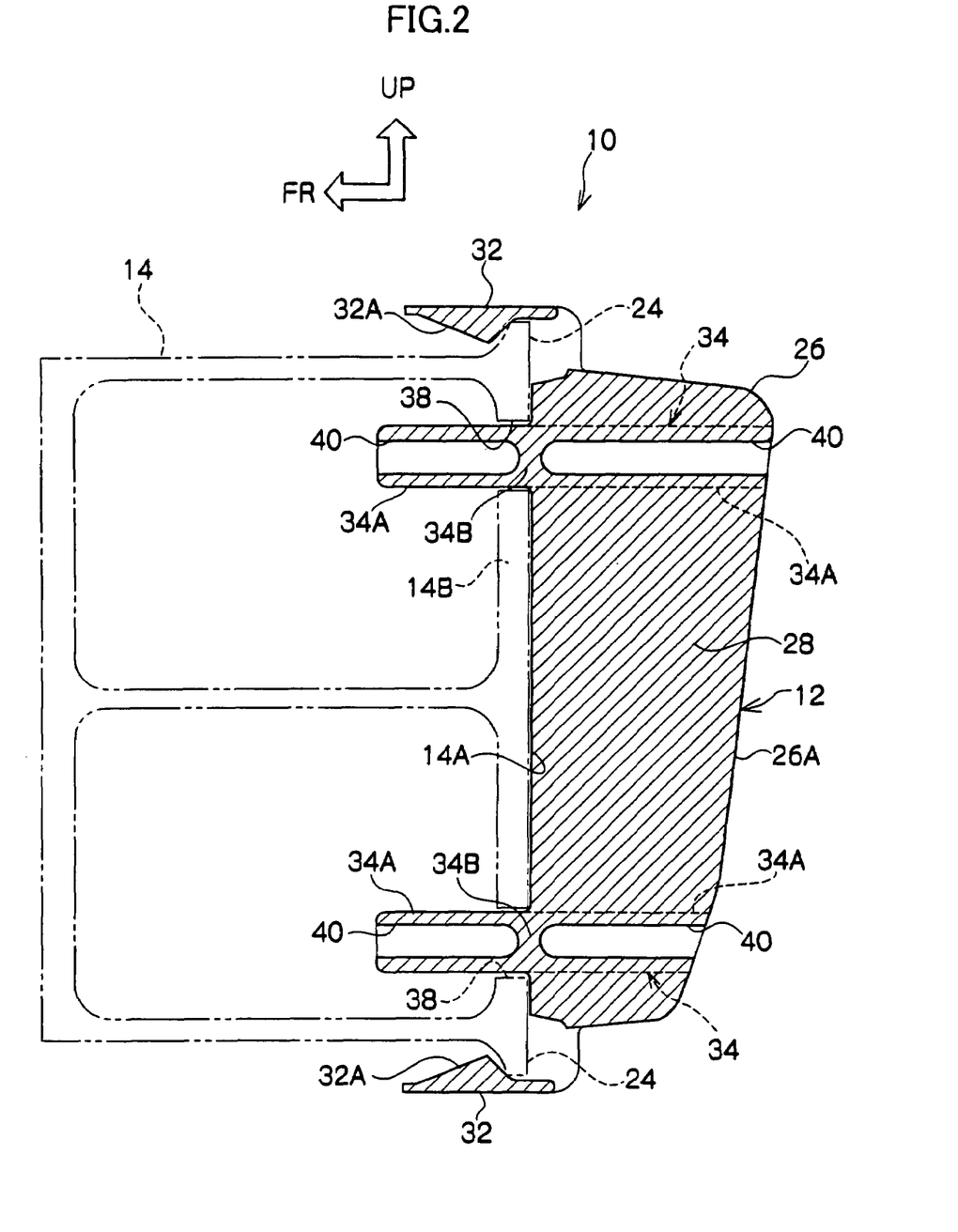
FIG. 2 is a cross-sectional view along line 2-2 of the attachment structure shown in FIG. 1.

As shown in FIG. 1, the rear bumper reinforcement 14 is disposed on the inner side of a rear bumper cover 18 and configures a rear bumper 19 of the vehicle 16 together with the rear bumper cover 18. The rear bumper reinforcement 14 is attached to a body 22 (vehicle body) of the vehicle 16 via rear bumper arms 20. As shown in FIG. 2, a pair of flange portions 24 that project upward and downward in the vertical direction is disposed on the vehicle rear side end portion of the rear bumper reinforcement 14.

The energy absorbing structure 12 is disposed between the rear bumper cover 18 and the rear bumper reinforcement 14 and includes a body portion 26 formed by a resin material into a box-like structure whose front side with regard to the vehicle 16 is open. Plural vertical direction ribs 28 and plural transverse direction ribs 30 are integrally formed inside of the body portion 26, so that the body portion 26 is formed in a honeycomb shape overall. The body portion 26 is disposed in contact with a vehicle rear side end surface 14A (attachment surface) of the rear bumper reinforcement 14. It will be noted that as the resin material configuring the energy absorbing structure 12, a resin material that is tough and not easily broken, for example, a mixture of polypropylene with polyethylene, is preferable.

Figure 3:
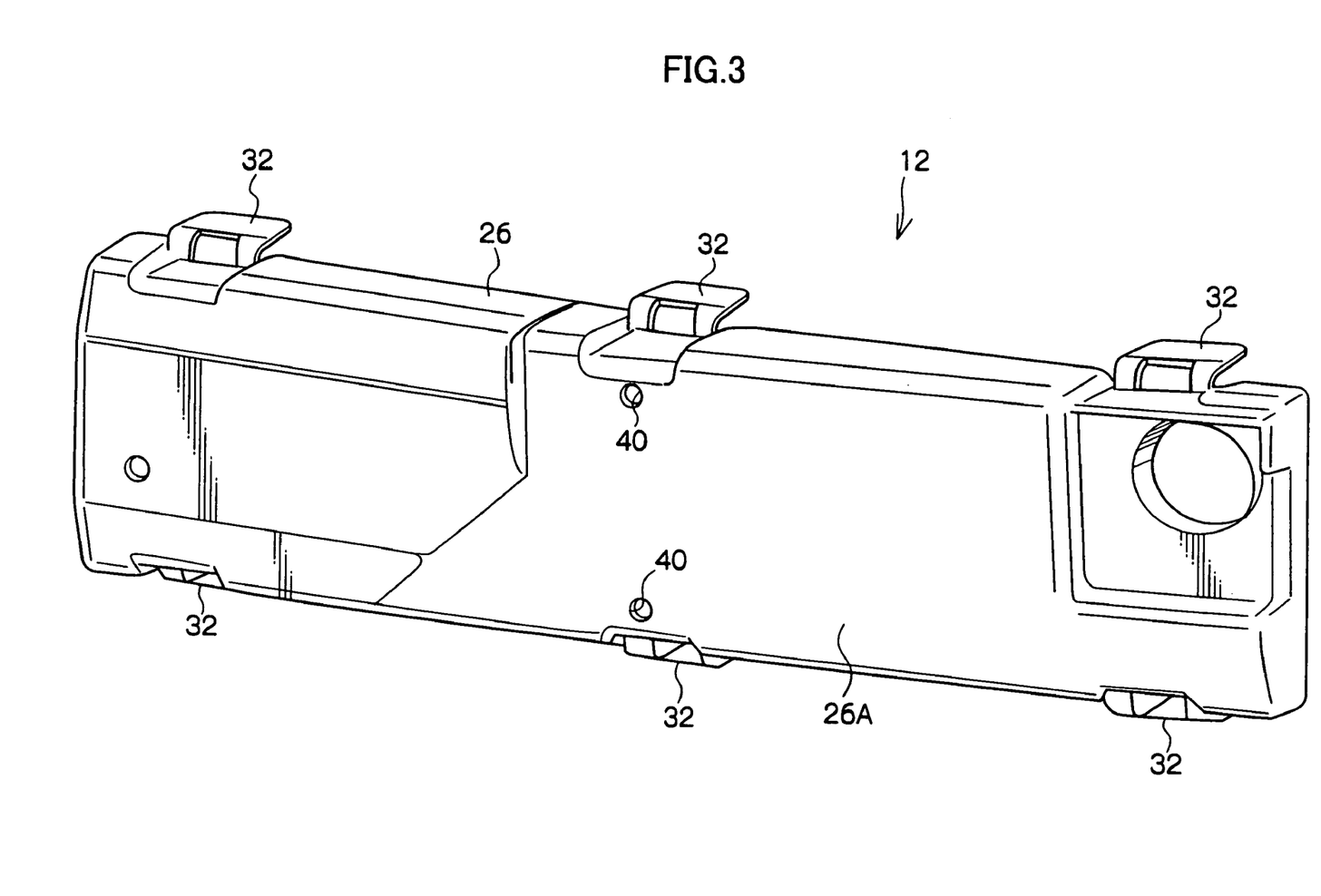
FIG. 3 is a perspective view showing the configuration of the front side of an energy absorbing structure that configures the attachment structure pertaining to the exemplary embodiment.
Figure 4:
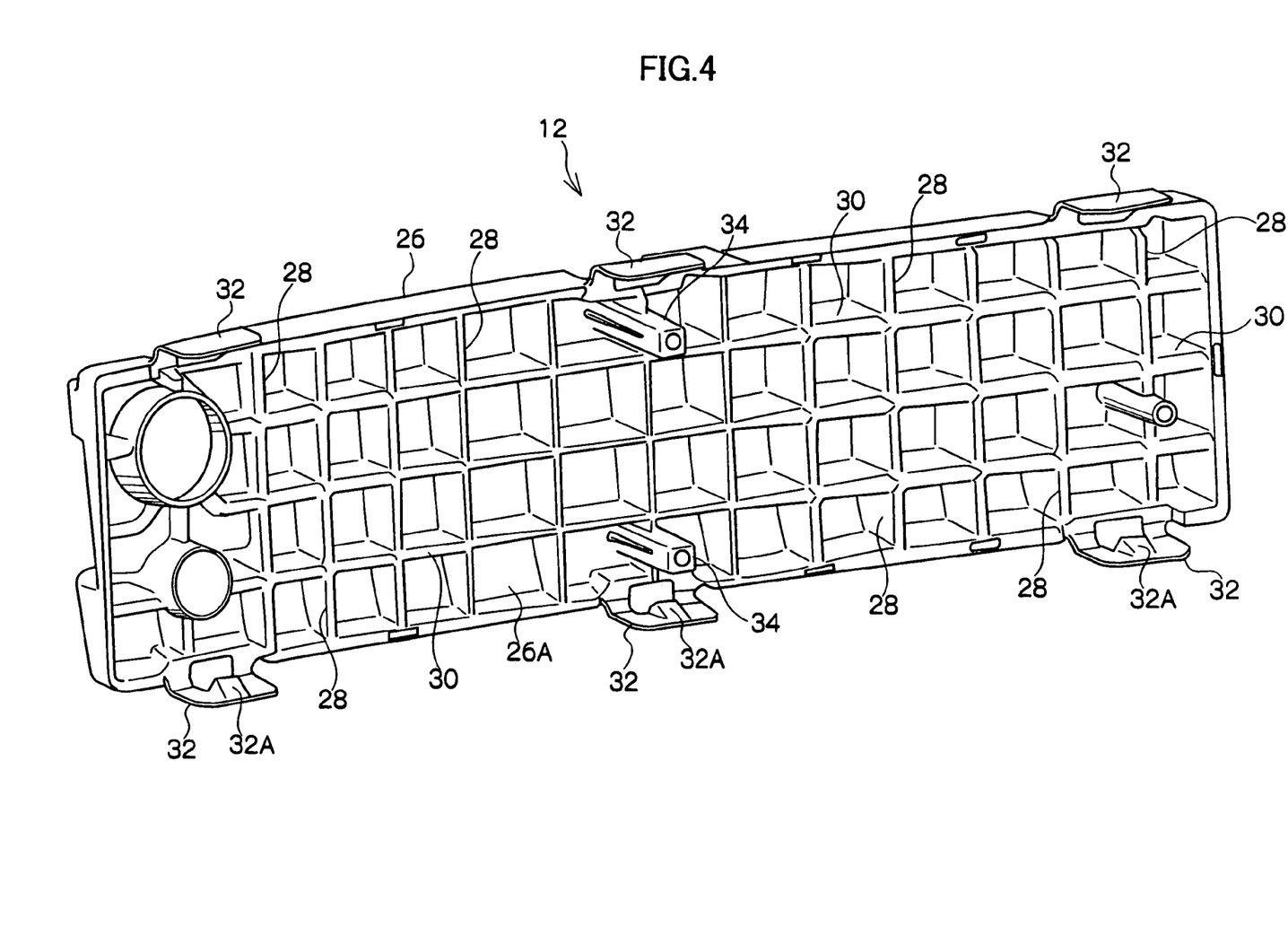
FIG. 4 is a perspective view showing the configuration of the rear side of the energy absorbing structure that configures the attachment structure pertaining to the exemplary embodiment.
Figure 5:
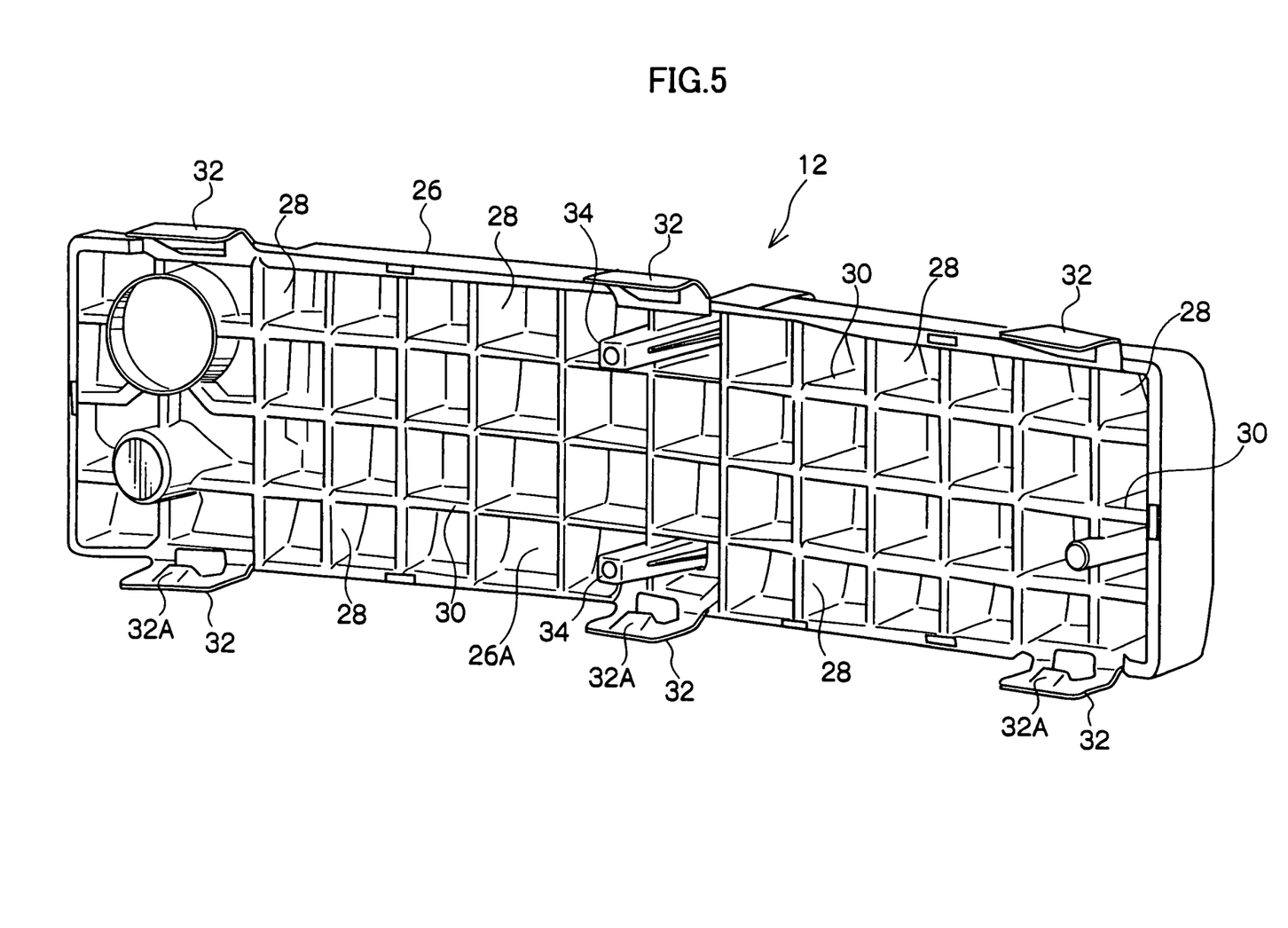
FIG. 5 is a perspective view showing the configuration of the rear side of the energy absorbing structure that configures the attachment structure pertaining to the exemplary embodiment.

As shown in FIG. 3 to FIG. 5, on both the upper and lower end portions (outer peripheral portion) of the body portion 26, plural locking claws 32 (in the present embodiment three locking claws 32 on each of the upper and lower end portions) are disposed. The locking claws 32 are formed in a plate-like shape, extend from the body portion 26 toward the vehicle front side, and are disposed such that the upper and lower locking claws 32 in each pair face each other. A projecting portion 32A that projects toward the rear bumper reinforcement 14 is disposed on each of the locking claws 32. The projecting portions 32A catch onto the aforementioned flange portions 24, whereby the energy absorbing structure 12 is locked to the rear bumper reinforcement 14. It will be noted that when the energy absorbing structure 12 is attached to the rear bumper reinforcement 14, slanted surfaces disposed on the projecting portions 32A of the locking claws 32 slidingly contact the flange portions 24, whereby the locking claws 32 elastically deform so that the projecting portions 32A of the locking claws 32 cross over the flange portions 24.

Figure 6:
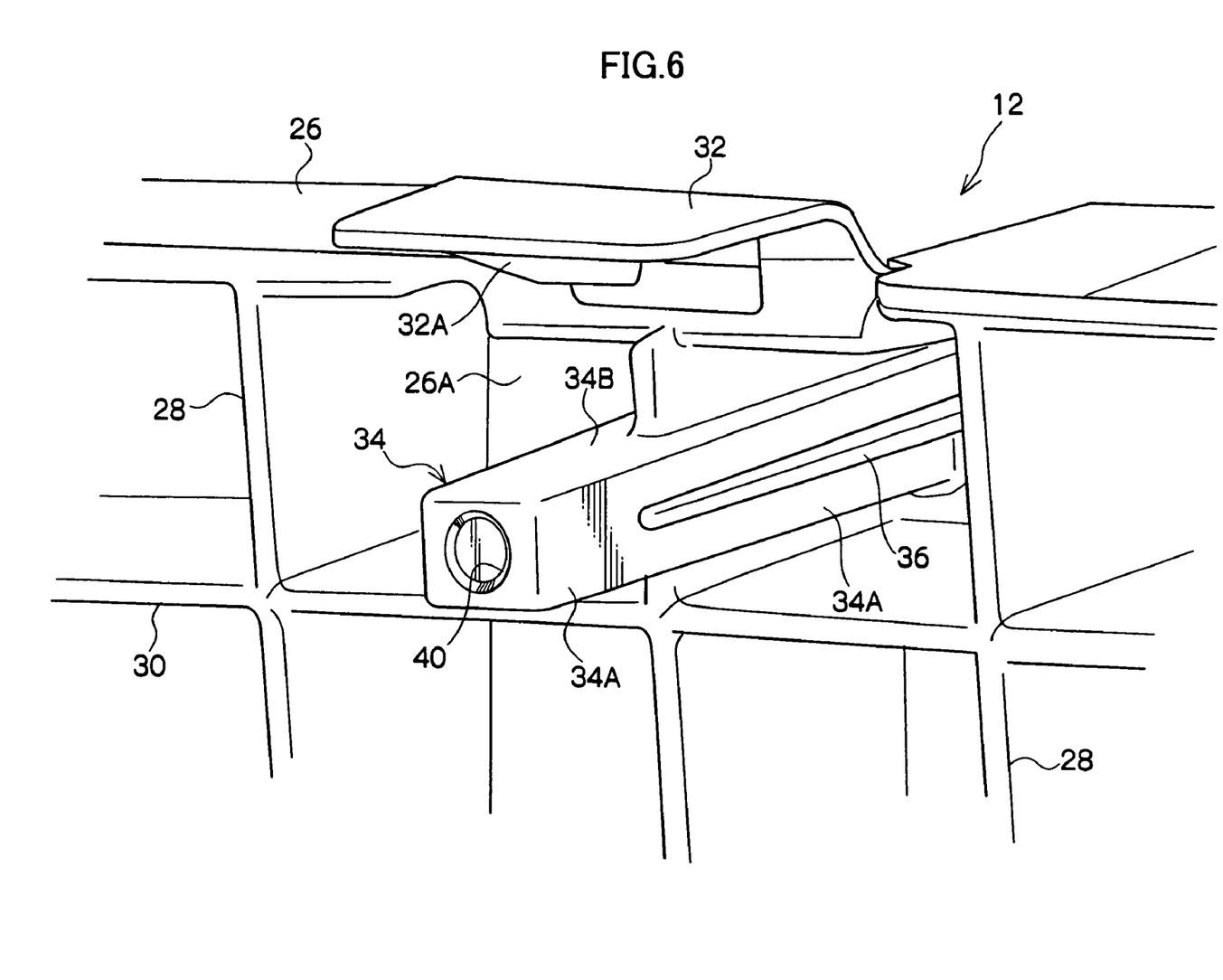
FIG. 6 is an enlarged perspective view showing the configuration of a portion disposed with a load receiving projection (boss) in the rear side of the energy absorbing structure that configures the attachment structure pertaining to the exemplary embodiment.

Moreover, bosses 34 serving as load receiving projections are disposed on the upper end side and the lower end side of the body portion 26 in the center portion of the body portion 26 in the width direction thereof. As shown in FIG. 6, each of the bosses 34 is formed in a square column shape, with the proximal end side being formed integrally with the vertical direction ribs 28 near the transverse direction ribs 30, the proximal end portion being integrally connected with a vehicle rear side wall 26A of the body portion 26, and the distal end side projecting from the body portion 26 toward the vehicle front side (the rear bumper reinforcement 14). Further, a rib 36, which is formed as reinforcement and corresponds to a convex portion, is disposed on both vehicle width direction end portions of the proximal end side of each of the bosses 34 so that the bosses 34 should be reinforced.

As shown in FIG. 2, insertion holes 38 are formed in a vehicle rear side wall 14B of the rear bumper reinforcement 14 in positions corresponding to the bosses 34, and the insertion holes 38 penetrate the vehicle rear side wall 14B in its plate thickness direction. The bosses 34 are inserted into the insertion holes 38, whereby the energy absorbing structure 12 is positioned with respect to the rear bumper reinforcement 14. Moreover, part of each of the aforementioned ribs 36 is configured to be disposed on the inner sides of the insertion holes 38 and to contact the inner peripheral portions of the insertion holes 38; in other words, the ribs 36 fulfill the role of crushable ribs.

The projectile amount of each of the bosses 34 from the body portion 26 is set to be larger than that of each of the locking claws 32 from the body portion 26, so that when the energy absorbing structure 12 is attached to the rear bumper reinforcement 14, the distal end portions of the bosses 34 are inserted into the insertion holes 38, whereby the energy absorbing structure 12 is positioned with respect to the rear bumper reinforcement 14. Additionally, in this state, the energy absorbing structure 12 is moved toward the rear bumper reinforcement 14, whereby the energy absorbing structure 12 is locked to the rear bumper reinforcement 14 by the locking claws 32.

Further, as shown in FIG. 2, weight-reducing holes 40 are formed in the distal end side and the proximal end side of each of the bosses 34, so that the distal end side and the proximal end side of each of the bosses 34 are formed as hollow portions 34A. A solid portion 34B is disposed in the intermediate portion of each of the bosses 34 along the longitudinal direction thereof, and the solid portions 34B are disposed in positions along the vehicle rear side end surface 14A in a state where the energy absorbing structure 12 is attached to the rear bumper reinforcement 14.

Here, in the attachment structure 10, when a load is applied in a direction along the vehicle rear side end surface 14A to the energy absorbing structure 12 attached to the rear bumper reinforcement 14, the bosses 34 interfere with the inner peripheral portions of the insertion holes 38 and receive the load. In this case, although a shearing load along the vehicle rear side end surface 14A is applied to the bosses 34, the shearing load is inputted at the solid portions 34B because, as mentioned above, the solid portions 34B are disposed in the bosses 34 in positions along the vehicle rear side end surface 14A.

Next, the function of the attachment structure of the present embodiment will be described.

In the attachment structure 10 of the above-described configuration, as shown in FIG. 1, the energy absorbing structure 12 deforms when the rear bumper 19 of the vehicle 16 collides with a collision object 42 (another vehicle, a wall, etc.), whereby the energy of the collision is absorbed. Thus, the amount of penetration of the collision object 42 into the body 22 can be reduced.

Moreover, when the rear bumper 19 of the vehicle 16 diagonally collides with the collision object 42 and a load along the vehicle width direction or the vehicle vertical direction (i.e., a load in a direction along the vehicle rear side end surface 14A of the rear bumper reinforcement 14) is applied to the energy absorbing structure 12, the bosses 34 inserted into the insertion holes 38 in the rear bumper reinforcement 14 interfere with the inner peripheral portions of the insertion holes 38 and receive the load. Consequently, application of the load to the locking claws 32 can be held back, and thus, breakage of the locking claws 32 can be curbed. Accordingly, falling of the energy absorbing structure 12 off the rear bumper reinforcement 14 can be prevented, so that even in several collisions, the collision energy can be stably absorbed by the energy absorbing structure 12.

Further, in the attachment structure 10, the bosses are formed integrally with the vertical direction ribs 28 near the transverse direction ribs 30. Accordingly, when a load is applied to the bosses 34, the bosses 34 can be strongly supported by the vertical direction ribs 28, and the load applied to the bosses 34 can be dispersed to the vertical direction ribs 28 and the transverse direction ribs 30, so that deformation of the bosses 34 can be effectively suppressed.

Moreover, in the attachment structure 10, because of interference between the bosses 34 and the insertion holes 38, when a shearing load along the vehicle rear side end surface 14A is applied to the bosses 34, the shearing load acts on the strong solid portions 34B. Consequently, breakage of the bosses 34 can be effectively controlled. Additionally, because the distal end sides and the proximal end sides of the bosses 34 are hollowly formed, the cooling efficiency of the bosses 34 can be improved when the energy absorbing structure 12 is molded by injection molding, and shrinkage of the bosses 34 can be reduced, and thus, the molding of the bosses 34 can be made easy.

Moreover, in the attachment structure 10, because part of each of the reinforcement-use ribs 36 disposed on the bosses 34 is disposed on the inside of the insertion holes 38 and contacts the inner peripheral portions of the insertion holes 38, play between the bosses 34 and the insertion holes 38 can be suppressed, and even if the clearance between the bosses 34 and the inner peripheral portions of the insertion holes 38 is large, the clearance can be reduced by the ribs 36. Consequently, transmission of a load that is applied to the energy absorbing structure 12 toward the locking claws 32 can be even more effectively suppressed.

Additionally, in the attachment structure 10, the locking claws 32 disposed on both the upper and lower end portions of the energy absorbing structure 12 catch onto the flange portions 24 disposed on both the upper and lower end portions of the rear bumper reinforcement 14, whereby the energy absorbing structure 12 is locked to the rear bumper reinforcement 14. For this reason, a load along the vehicle width direction acting on the energy absorbing structure 12 is not transmitted to the locking claws 32, and thus, breakage of the locking claws 32 can be even more effectively controlled. Moreover, because the locking claws 32 are disposed in positions where little load is transmitted from the rear bumper reinforcement 14, the load for elastically deforming the locking claws 32 can be set small while preserving strength of the locking claws that is sufficient for withstanding energy during collision. Thus, the energy absorbing structure 12 can be attached to the rear bumper reinforcement 14 by a small attaching force, and attaching the energy absorbing structure 12 can be made easy.

Further, because the locking claws 32 are disposed on the outer peripheral portion of the energy absorbing structure body portion 26, the honeycomb shape of the body portion 26 can be made uniform, and reduction of the area of the vehicle rear side wall 26A of the body portion 26 can be suppressed. Accordingly, collision energy absorption efficiency of the body portion 26 can be improved.

Moreover, because the locking claws 32 are disposed on the outer peripheral portion of the body portion 26, the shape of the locking claws 32 can be set freely. Therefore, even when the rear bumper reinforcement 14 curves when seen from above (see FIG. 1), the energy absorbing structure 12 can be securely locked to the rear bumper reinforcement 14 by the locking claws 32.

In the above-described exemplary embodiment, the bosses 34 had a configuration disposed with the hollow portions 34A and the solid portions 34B, but the bosses 34 are not limited to this embodiment and may also configured as an entirely solid boss.

Further, in the above-described exemplary embodiment, the bosses 34 is configured integrally with the vertical direction ribs 28, but the bosses 34 are not limited to the above configuration but can be configured integrally with the transverse direction ribs 30 or with both the vertical direction ribs 28 and the transverse direction ribs 30. However, in the energy absorbing structure 12 pertaining to the above-described exemplary embodiment, the transverse direction ribs 30 have an important function as a shock absorbing member, and when the bosses 34 that are formed integrally with the transverse direction ribs 30 have the hollow portions 34A, the rigidity of the transverse direction ribs 30 can be deteriorated. Consequently, when the bosses 34 are disposed with the hollow portions 34A, as in the above-described exemplary embodiment, the bosses 34 are preferably configured integrally with the vertical direction ribs 28 at a position close to the transverse direction ribs 30. Further, when the bosses 34 has no hollow portions 34A, the bosses 34 preferably configured integrally with both the vertical direction ribs 28 and the transverse direction ribs 30. The bosses 34 configured in such a manner have even more improved support rigidity.

Moreover, in the above-described exemplary embodiment, the vertical direction ribs 28 and the transverse direction ribs 30 were disposed on the inner side of the body portion 26 of the energy absorbing structure 12, but the invention is not limited to this embodiment and diagonal direction ribs may be disposed on the inner side of the body portion 26.

Additionally, in the above-described exemplary embodiment, the locking claws 32 were disposed on the outer peripheral portion of the body portion 26, but the invention is not limited to the above configuration and the locking claws 32 may also be disposed toward the center portion of the body portion 26. In this case, through holes into which the locking claws 32 are inserted are formed in the vehicle rear side wall 14B of the rear bumper reinforcement 14 so that the projecting portions 32A of the locking claws 32 catch onto the hole edge portions of the through holes.

Further, in the above-described exemplary embodiment, a case was described where the invention was applied to an attachment structure for attaching the energy absorbing structure 12 to the rear bumper reinforcement 14. The present invention is also applicable to an attachment structure for attaching an energy absorbing structure to a front bumper reinforcement.

The foregoing description of the embodiment of the present invention has been provided for the purpose of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An attachment structure of an energy absorbing structure comprising:
    a bumper reinforcement that includes an attachment surface, insertion holes having inner peripheral portions and being formed in the attachment surface;
    an energy absorbing structure disposed in contact with the attachment surface and including vertical direction ribs and transverse direction ribs that are connected with each other;
    locking claws that are disposed on the energy absorbing structure and engage with the bumper reinforcement to fix the energy absorbing structure to the bumper reinforcement; and
    load receiving projections that are formed integrally with the vertical direction ribs except at a position where the vertical direction ribs and the transverse direction ribs are connected with each other, the load receiving projections including a hollow portion and a solid portion, and being inserted into the insertion holes, the solid portion being disposed in positions along the attachment surface when the load receiving projections are inserted into the insertion holes, such that when a load in a direction along the attachment surface acts on the energy absorbing structure, the load receiving projections interfere with the inner peripheral portions of the insertion holes and receive the load.

2. The attachment structure of an energy absorbing structure of claim 1, wherein the locking claws are disposed on an outer peripheral portion of the energy absorbing structure and engage with an outer peripheral portion of the bumper reinforcement.

3. The attachment structure of an energy absorbing structure of claim 1, wherein convex portions disposed on inner sides of the insertion holes are disposed on the load receiving projections.

4. The attachment structure of an energy absorbing structure of claim 2, wherein convex portions disposed on inner sides of the insertion holes are disposed on the load receiving projections.

* * * * *